Nov. 24, 1970 D. WILLARD 3,542,971

MAGNECTIC TRANSDUCER HAVING POSITIONING SURFACES

Filed Aug. 21, 1967 2 Sheets-Sheet 1

DENNIS WILLARD
INVENTOR.

BY

Sprinkley & Horne
ATTORNEYS

Nov. 24, 1970 D. WILLARD 3,542,971

MAGNECTIC TRANSDUCER HAVING POSITIONING SURFACES

Filed Aug. 21, 1967 2 Sheets-Sheet 2

DENNIS WILLARD
INVENTOR.

BY Spensley & Horn
ATTORNEYS

United States Patent Office 3,542,971
Patented Nov. 24, 1970

3,542,971
MAGNETIC TRANSDUCER HAVING POSITIONING SURFACES

Dennis Willard, 5937 W. 78th St., Los Angeles, Calif. 90045

Filed Aug. 21, 1967, Ser. No. 662,144
Int. Cl. G11b 5/14, 5/28, 5/42
U.S. Cl. 179—100.2 10 Claims

ABSTRACT OF THE DISCLOSURE

A low-cost magnetic, recording, reading and erasing head assembly for use with magnetic tape characterized by a standard form of alignment case in which varying assemblies for recording, reading (hereinafter designated as "retrieving") or erasing informatiton on the tape may be contained. The cases (which also function as an alignment jig) enable a plurality of cases to be mounted in stacks for multiple channel use with precise inter-track location.

BACKGROUND OF THE INVENTION

Field of the invention

The invention relates to heads for recording, retrieving and/or erasing signals on the magnetic surface of a tape transversed past the head.

Prior art

The construction of magnetic heads and the method of assembling magnetic heads have consistently resulted in precision and cost being opposed comprising factors. Thus, the quest for precision has usually resulted in a corollary rise in cost. In addition, the design of heads for various applications (i.e., digital, video, erase instrumentation, etc.) required substantially different tooling and involved a minimum of commonality. The arrangements for precise inter-channel spacing and track location have been cumbersome, and costly. In one form of prior art device the magnetic portion of the head is a plurality of laminations in side by relationship. The individual laminations are formed by etching and are then aligned and laminated to form a half of a core. Two core halves are then joined together to form a core with magnetic gaps separating the core halves. Some form of grinding may be required to finish the core before and after placement of the core in a housing. The housing may be especially constructed and aligned for each recorder, the alignment being accomplished by independent jigs and various alignment or screw arrangements. It can be seen that such a prior art arrangement involves many assembly steps, a large amount of tooling for extensive product mixes and many parts.

SUMMARY OF THE INVENTION

The invention contemplates the provision of an assembly of parts for creating heads for recording, retrieving or erasing magnetic records on tape having a magnetizable surface layer, said heads comprising a basic container or casing in which, as desired, various configurations of elements may be installed for the specifically intended purpose. Moreover, the casing component is made of such configuration that it also serves as a jig during assembly and enables a plurality of heads to be secured in stacked relation for a plurality of channel function. Such casings are of uniform thickness and are provided with means for simultaneous engagement by connecting means whereby a plurality of heads may be united in a stack for plural channel engagement with the tape with which it is used. The lamination employed in the head is a simple strip which avoids many of the assembly steps incident to forming a core but provides a proportion desirable in a magnetic path. Thus, the invented head minimizes parts, reduces tooling, reduces assembly steps and permits stacking.

BRIEF DESCRIPTION OF THE DRAWINGS

In the accompanying drawings, which form a part of this specification, there are shown certain presently preferred embodiments of the invention. Specifically.

DETAIL DESCRIPTION OF THE PRESENTLY PREFERRED EMBODIMENTS

Figure 1:
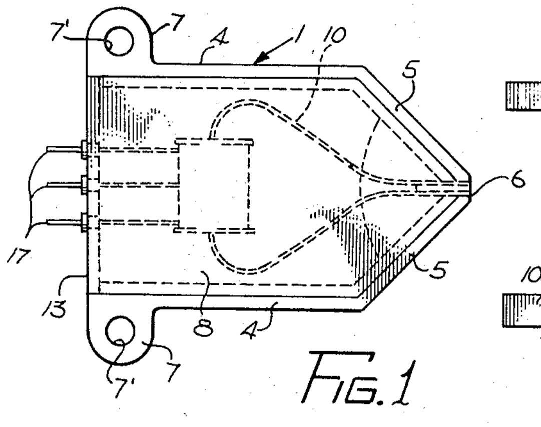
FIG. 1 is a plan view of a head assembly constituting a first embodiment of the invention.

Referring to the drawings and particularly to FIGS. 1–8, the first disclosed embodiment comprises a case 1 and what, for convenience, will be designated as a "sensor assembly" 2. It is recognized that, technically, the only "sensing" is in the reading or retrieving of information on a magnetic tape being transported past the head, but it will be understood that the term "sensing assembly" as used hereinafter will be deemed to include all uses of the device.

Figure 13:
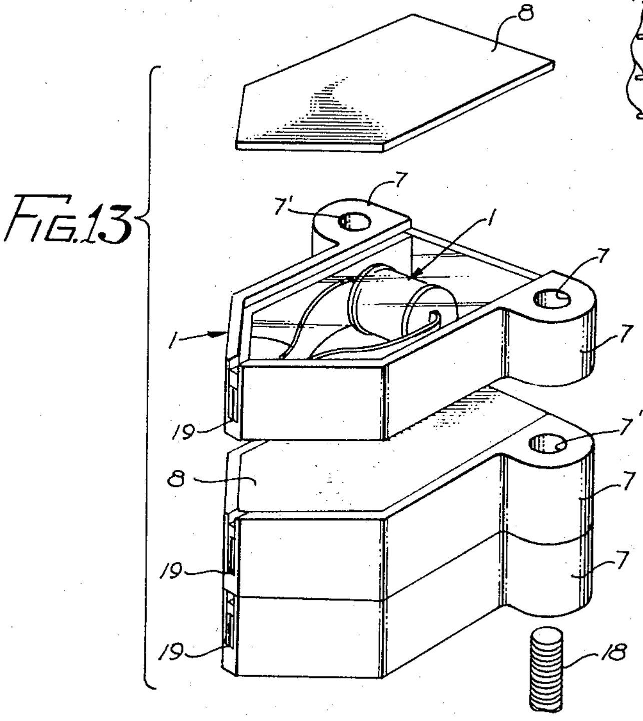
FIG. 13 is a perspective, exploded view showing the mounting of a plurality of the head units arranged in a "stack"

The case 1 is formed as a casting or molding and may be of pressed, sintered metal powder, a die casting or a plastic molding. The case comprises a flat bottom 3 (FIG. 6) of modified pentagonal configuration comprising parallel sides, a rear end extending between said sides at right angles thereto and a pointed front end comprising sides equally converging toward one another and forming an apical front end. (It is understood that the term "pentagonal" as used herein includes configuration wherein the sides or wall are other than straight, that is, curved walls.) Rising from the parallel side edges of the case bottom are side wall portion 4, 4, said side walls continuing along the said converging edge portions as at 5, 5 and uniting to form the apical point of area 6. At their rear ends, the side walls 4, 4 are thickened laterally to form perforated ear portion 7, 7 having bores 7', 7'. The bores 7', 7' have axes that extend normal to the plane of bottom 3. The ear portion 7, 7, that serve as means engagable with mounting or securing means for either a single head or for a stack of heads in which the bores are maintained in alignment by the mounting or securing means. The upper edges of the walls are recessed for reception of a cover member 8 with the outer surface thereof perferably not extending above a plane containing the upper end edges of the walls 56 (see FIGS. 6 and 13). Before assembly of the sensor assembly therein, the apical end 6 of the case wall is provided with a slot 9 extending therethrough and through which, upon assembly, the tape engaging portion of the sensor assembly will extend to the outer surface of the case. From the description it will become clear that the case 1 serves as a jig for forming the core, serves as a tool for aligning the core and serves as a case.

Figure 2:
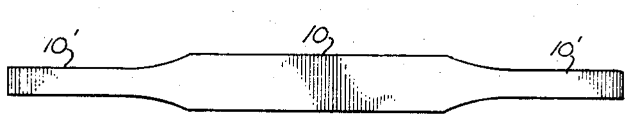
FIG. 2 is a plan view of the magnetic flux conducting components, hereinafter sometimes referred to as "lamination" or "strip" or "core" employed in the different embodiments of the invention.
Figure 3:
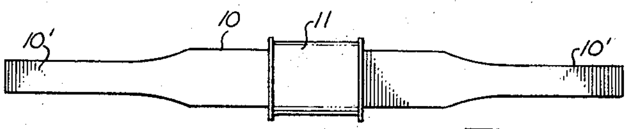
FIG. 3 is a view similar to FIG. 2, but showing a coil.

The sensor assembly 2 includes a magnetic flux conducting member 10, hereinafter sometimes referred to as a "lamination" or "strip" or "core" said strip comprising usually a single thin strip of a malleable paramagnetic material having high permeability and low coercivity preferably having a thickness of several thousandths of an inch. The strip has a pair of flat surfaces and a pair of sides. When formed into a core the sides are generally parallel to the path of travel of the magnetic media and the surfaces are generally perpendicular thereto. Among acceptable materials are Supermalloy, HYMU–80 or Hypermax. For some uses such as high flux, medium frequency, recording heads of, say 10 mHz., a plurality of laminations could be stacked in side by side relation. As shown in FIGS. 2 and 3, these strips can be somewhat wider at their mid length portion than at the ends 10', but not necessarily. When space permits, this gives better coupling. The ends 10', 10' are reduced in width to approximately the width of the track on the tape with which they are intended to register or record. At their mid length the laminations extend through a coil 11 employable either to energize these strips to carry magnetic flux to a tape or to be energized by magnetic flux picked up from the tape by the strip or strips. It should be appreciated that the strip core is a lamination which is a substantial simplification in comparison to the common side by side laminated core even when several strips are employed. The number of assembly steps incident to forming the strip core are minimal in comparison to other prior art devices.

Figure 4:
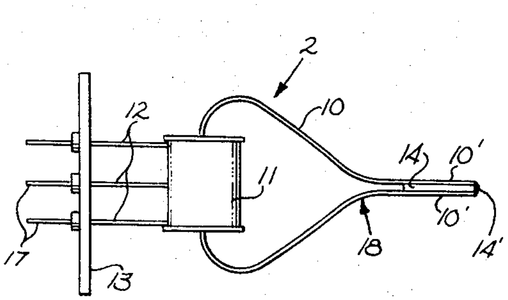
FIG. 4 is a plan view of a sensor assembly of the first embodiment ready for installation in the case.
Figure 5:
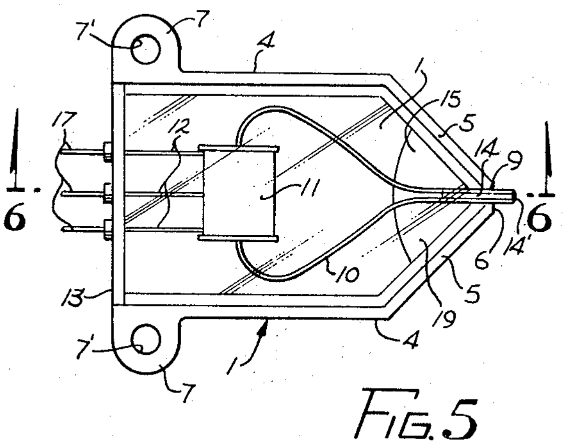
FIG. 5 is a plan view showing the sensor assembly of FIG. 4 installed in a case ready for securing therein by filling the case with a potting compound.
Figure 14:
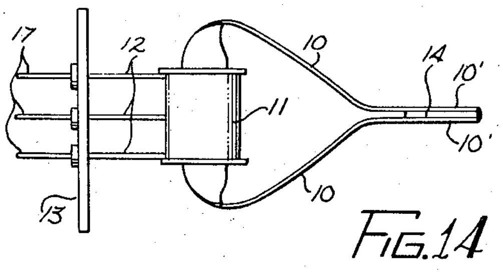
FIG. 14 is a plan view of the strip core when bent to provide thinness.
Figure 15:
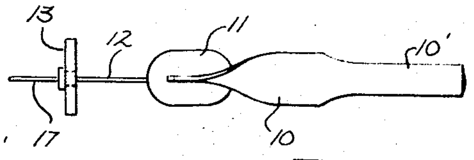
FIG. 15 is an end view of the embodiment shown in FIG. 14.

Referring next to FIG. 4, the coil winding connected has leads 12, 12 which extend through insulators in member 13 which may form the rear wall of the case. The leads 12 may be attached to pins 17. Strip 10 is formed into a core-like shape with the ends of the strip bent into parallelism with one another pointing away from the member 13. An insulator or gap material 14 which is non-magnetic is (e.g., 0.0004" copper strip) interposed between the end of strip 10. The ends of the strip 10 and the interposed copper strip are secured together by spot welding as at 14'. It should be noted that for their heads it is desirable to loosely wind coil 11 and bend (e.g., one-quarter turn or 90 degrees) and flatten strip 10 about area 18 so that the wide midsection and coil do not limit the thinness attainable. This embodiment is shown in FIGS. 14 and 15 with the coil wound in an oval form. After bending, the strip and coil are heat treated (e.g., annealed).

The sensor assembly is then placed in the case 1 with the ends projecting through the slot 9. It should be noted in FIG. 6 that adjacent to the apical area of the casing, the bottom is provided with a thickened portion 15 which positions the ends 10' of strip 10. The thickened portion 15 has a precisely located index or position surface 19 which is accurately located with respect to surface 20 (i.e., ±0.0002"). In addition, the dimension 22 is precisely controlled (i.e., ±0.0001"). The controlling of dimension 22 and the location of surface 19 enables multi-track heads with precise inter-track spacing to be readily assembled. The case 1 also serves to hold strip 10.

Figure 6:
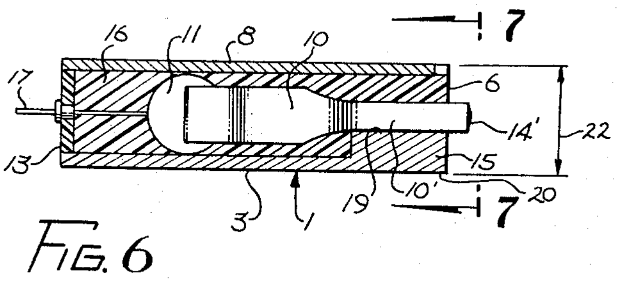
FIG. 6 is a longitudinal section taken in the plane of the line 6—6 of FIG. 5.
Figure 7:
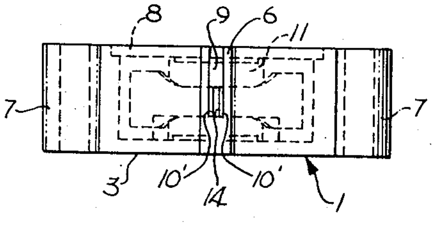
FIG. 7 is an end elevational view taken in the plane of the line 7—7 of FIG. 6.

Following the above assembly of the sensor component and casing, the interior of the casing is filled with a potting compound 16 which is electrically non-conductive. An epoxy with a filler of aluminum oxide has been found to be satisfactory but any compound which will electrically isolate the sensor component from the case may be used so long as the compound will not be adversely affected by the environment in which the head is used and does not permit shifting of the components during aging. Since the case is formed from non-magnetic material, such as plastic or non-ferrous metal or alloy, there is no problem of magnetic shorting to the case. The potting compound extends to the level of the recessed upper edge of the casing walls and the cover 8 is applied and secured by any appropriate means (usually by a suitable adhesive or fastener). This results in the completion of the assembly as best shown in FIGS. 6 and 7.

Figure 8:
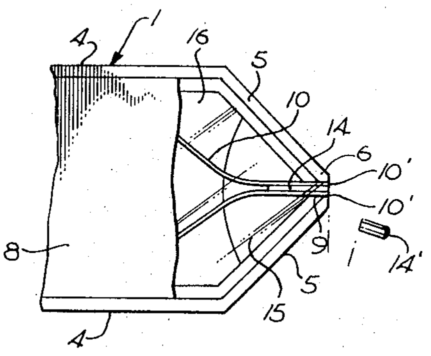
FIG. 8 is a fragmentary plan view showing the first step of manufacture after the sensor assembly has been installed and secured by the potting compound.
Figure 9:
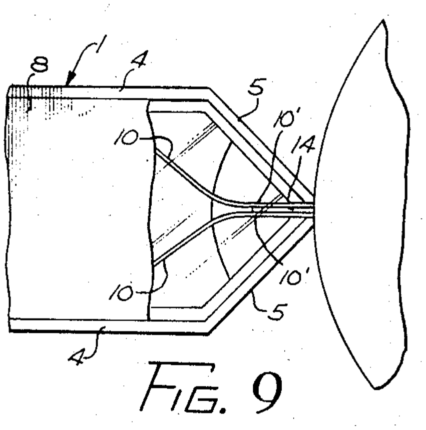
FIG. 9 is a fragmentary view similar to FIG. 8 showing the final step of manufacture of the completed unit.

When the potting compound has set, and the cover is secured, the unit is ready for the finishing operations. The protruding end of the sensor assembly, including the spot weld is cut off substantially flush with the apical area of the casing as indicated in FIG. 8. The said apical area of the assembled head is then subjected to a grinding operation (see FIG. 9) in which the longitudinal center line of the assembly is disposed coincident with a radial line of a grinding wheel G having a radial dimension equal to the radial dimension of the tape to be operatively engaged by the head at the point of such engagement. The apical area of the head will be ground to that radius at a predetermined distance from a selected point on the mounting means for the heads, e.g., a line connecting the center lines of the bores 7', 7'. It is understood that the particular contour resulting from the grinding will vary according to the particular application. Upon completion of the grinding operation, the head is ready for testing and inspection.

The casing 1 is susceptible of receiving various forms of sensor assemblies and the possible use of multiple laminations in the first described embodiment has already been mentioned. Other possibilities are shown, by way of example, in FIGS. 10, 11 and 12.

Figure 10:
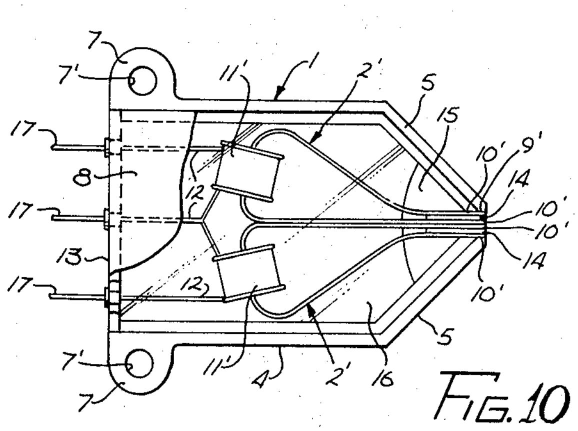
FIG. 10 is a plan view, partly in section, of a second embodiment of the invention showing two itnerconnected sensor assemblies installed to create an erasing head.

In FIG. 10 there is shown the installation of a pair of sensor assemblies 2', 2' in side by side relation with the adjacent ends of the conductor strips component thereof in contact with one another and with adjacent sides of the coils 11', 11' thereof connected to a common lead. This would provide a head having an exceptionally high erasing capability. Other than forming the slot 9" sufficiently wide to accommodate the four ends together with the interposed copper strips, the casing is the same as in the first embodiment and the assembly procedure is the same as previously described. Accordingly, all parts which are identical with the first embodiment have been given the same numbers.

Figure 11:
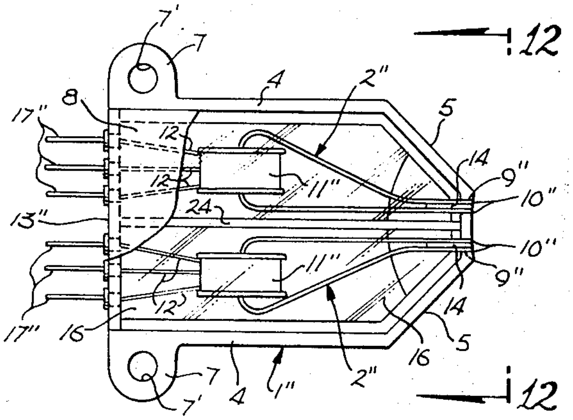
FIG. 11 is a plan view, partly in section, showing a third embodiment of the invention in which two separate sensor assemblies are separately mounted in the case whereby the head may be employed for recording and retrieving information on tape.
Figure 12:
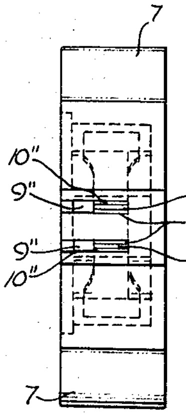
FIG. 12 is an end view taken in the plane of line 12—12 of FIG. 12.

Another embodiment is shown in FIGS. 11 and 12 in which two completely separate sensor assemblies are incorporated in side by side relation in the casing 1 with resultant formation of a multiple gap head adapted for use on digital tape transporting devices. In this embodiment, the sensor assemblies 2", 2" have the exposed ends 10", 10" thereof disposed in separate slots 9", 9" in the apical areas of the casing 1" and the coils 11", 11" thereof separately connected into the circuits served thereby by leads 12 extending through insulators in the casing end number 13". Preferably the casing 1" is provided with a longitudinal partition 17 forming separate compartments for the two sensor assemblies and acting as a magnetic shield. This material would be a high permeability, low circuitry material several thousandths inch in thickness. This head may be employed for substantially simultaneous record and retrieve operations.

What is claimed is:

1. In a stack of magnetic transducers for use with plural channel recording medium, a magnetic transducer comprising:

a casing having a plurality of side walls forming a perimeter with an apical area and a bottom, said apical area having an opening which is approximately perpendicular to said bottom, said bottom having an outer surface and said casing having another outer surface precisely spaced therefrom, and parallel thereto, said bottom having a position surface which is precisely located within said casing at a precise distance from and parallel to said outer surface of said bottom;

a strip core having a generally triangular shape including at least one strip of magnetic material having a pair of closely adjacent and substantially coplanar ends with a non-magnetic material therebetween, a pair of flat relatively wide surfaces substantially perpendictular to said ends, said flat surface and ends forming an angle of said triangular shape and a pair of narrow edges disposed along the portion of said strip which define said angle, one of said edges engaging and positioned by said position surface, said ends and non-magnetic material projecting through said apical area, said non-magnetic material defining a gap and being positioned by the positioning of said edges by said position surface relative to said casing outer surfaces, and the remainder of said strip core within said perimeter;

the bottom surface of one transducer engaging the said other surface of an adjacent transducer in a said stack of transducers;

and means for connecting said transducers to position the gaps thereof in alignment.

2. The structure recited in claim 1, wherein a coil is wound around said strip core; a non-electrically conductive potting compound fills said casing and surrounds said strip core; said casing has a recess about its perimter for receiving a cover; and a cover for enclosing said casing and said strip core therein, said other surface being a surface of said cover.

3. The structure recited in claim 1, wherein there are a plurality of strips for each strip core.

4. The structure recited in claim 1, wherein there is included within each said casing a plurality of said strip cores each projecting through said apical opening and forming separate magnetic paths.

5. The structure recited in claim 1 wherein the midsection of said strip is wider than said pair of flat surfaces.

6. The structure recited in claim 1 wherein said side walls comprise a pair of opposite side walls and where the distance between said walls is precisely controlled.

7. The structure recited in claim 1 wherein said casing has a pair of opposite side walls and said connecting means are mounted on said opposite side walls.

8. The structure recited in claim 7 wherein said connecting means cause said apical areas of connected casings to be aligned in a substantially straight line.

9. The structure recited in claim 8 wherein said connecting means comprise bolt holes defined by said opposite walls, which are substantially parallel to said walls.

10. A method of manufacturing a stack of magnetic transducers comprising forming each of a plurality of transducers by the following steps:

forming a casing part having a bottom surface and wall means with an opening through said wall means;

forming a planar cover;

forming a position surface within said casing precisely located from said surface and parallel thereto;

forming a core from a flat strip of magnetic material including positioning opposite end portions thereof so that flat surfaces are adjacent and spaced by a gap forming element;

positioning said core within said casing with the end portions and gap forming element extending at least into said opening;

positioning the end portions of said flat strip so that the edge thereof engages said position surface within said casing;

filling said casing with a non-electrically conductive potting compound material;

placing said cover on said casing part with the top surface thereof parallel to and precisely spaced from the bottom surface;

and thereafter stacking a plurality of said transducers with the top surface of one transducer engaging the bottom surface of an adjacent transducer and with the said gaps in alignment, said gaps being precisely spaced.

References Cited

UNITED STATES PATENTS

| | | | |
|---|---|---|---|
| 2,754,569 | 7/1956 | Kornei | 179—100.2 |
| 3,426,338 | 2/1969 | Gerding | 179—100.2 |
| 2,668,878 | 2/1954 | Munroe | 179—100.2 |
| 2,868,889 | 1/1959 | Patterson | 179—100.2 |
| 2,895,015 | 7/1959 | Zenel et al. | 179—100.2 |
| 2,939,920 | 6/1960 | Leilich | 179—100.2 |
| 2,946,859 | 7/1960 | Loewe et al. | 179—100.2 |
| 3,233,046 | 1/1966 | Moehring | 179—100.2 |

FOREIGN PATENTS

| | | |
|---|---|---|
| 769,651 | 3/1957 | Great Britain. |
| 889,793 | 1/1962 | Great Britain. |
| 889,794 | 2/1962 | Great Britain. |

BERNARD KONICK, Primary Examiner

R. S. TUPPER, Assistant Examiner

U.S. Cl. X.R.

29—603